United States Patent
Yoon et al.

(10) Patent No.: US 8,119,987 B2
(45) Date of Patent: Feb. 21, 2012

(54) PROCESS AND APPARATUS FOR THE MEASUREMENT OF THERMAL RADIATION USING REGULAR GLASS OPTICS AND SHORT-WAVE INFRARED DETECTORS

(76) Inventors: Howard W. Yoon, Gaithersburg, MD (US); George P. Eppeldauer, Gaithersburg, MD (US)

(*) Notice: Subject to any disclaimer, the term of this patent is extended or adjusted under 35 U.S.C. 154(b) by 273 days.

(21) Appl. No.: 12/472,632

(22) Filed: May 27, 2009

(65) Prior Publication Data

US 2009/0321639 A1   Dec. 31, 2009

Related U.S. Application Data

(60) Provisional application No. 61/076,157, filed on Jun. 27, 2008.

(51) Int. Cl.
*G01J 5/02* (2006.01)
(52) U.S. Cl. .............. 250/339.01; 250/330; 250/338.1
(58) Field of Classification Search .......... 250/330, 250/332, 339.01, 339.03, 339.05, 339.09
See application file for complete search history.

(56) References Cited

U.S. PATENT DOCUMENTS

| | | | |
|---|---|---|---|
| 4,659,928 A | | 4/1987 | Tew |
| 2002/0030163 A1* | | 3/2002 | Zhang .................. 250/330 |
| 2004/0056199 A1* | | 3/2004 | O'Connor et al. ...... 250/341.1 |
| 2005/0139754 A1 | | 6/2005 | Colandene |
| 2007/0170363 A1* | | 7/2007 | Schimert et al. .......... 250/353 |
| 2009/0224154 A1* | | 9/2009 | Jancic et al. .............. 250/330 |

OTHER PUBLICATIONS

A. Rogalski and K. Chrzanowski, Infrared devices and technique, Opto-Electronics Review, 10(2): 111 (2002).
D.G. Crowe et al., "Detectors" in Electro-Optical Components, The Infrared and Electro-Optical Systems Handbook, Infrared Information Analysis Center, Michigan, 1993.
H.W. Yoon, D.W. Allen, R.D. Saunders, "Methods to reduce the size-of-source effect in radiometeres", Metrologia 42, 89-96, (2005).
http://www.fresneltech.com, "Home" (2009).
NIST Technical Note 1438, pp. 69-74, U.S. Government Printing Office, 2001.
Specifications for Electro-Optical Industries EOI 401HV Radiometer, http://www.electro-optical.com/pdf/eoir323c.pdf (2006).
Expereience with commercial photon counting board: Fastcomteck p7888 time of flight, http://www.fastcomtec.com/products/ultra-fast-multiscalers/p7888.html (2009).
Alessandrom Fedrizzi, Thomas Herbst, Thomas Jennewein, Anton Zeilinger, "A fiber-coupled wavelength tunable source of narrowband entangled photons."
Experience with commercial photon counting board: www.ortec-online.com/download/9353.pdf, ORTEC Digitizer Model 9353 (2008).

* cited by examiner

*Primary Examiner* — Mark R Gaworecki
(74) *Attorney, Agent, or Firm* — Absolute Technology Law Group, LLC

(57) ABSTRACT

An infrared measurement apparatus and method to detect and view ambient-temperature objects using short-wave infrared ("SWIR") detectors which operate in a wavelength region from 2.0 μm to 2.5 μm.

17 Claims, 5 Drawing Sheets

PROCESS AND APPARATUS FOR THE MEASUREMENT OF THERMAL RADIATION USING REGULAR GLASS OPTICS AND SHORT-WAVE INFRARED DETECTORS

CROSS-REFERENCE TO RELATED APPLICATIONS

This application claims priority to U.S. Provisional Application No. 61/076,157 filed on Jun. 27, 2008.

STATEMENT REGARDING FEDERALLY SPONSORED RESEARCH OR DEVELOPMENT

The invention described herein was made by employees of the United States Government and may be manufactured and used by or for the Government for Government purposes without the payment of any royalties.

FIELD OF INVENTION

The invention described herein relates generally to the field of infrared measurement devices and processes, and more specifically to an apparatus and process for detecting and viewing ambient-temperature objects using short-wave infrared ("SWIR") detectors which operate in a wavelength region from 2.0 µm to 2.5 µm.

GLOSSARY

Figure 1:
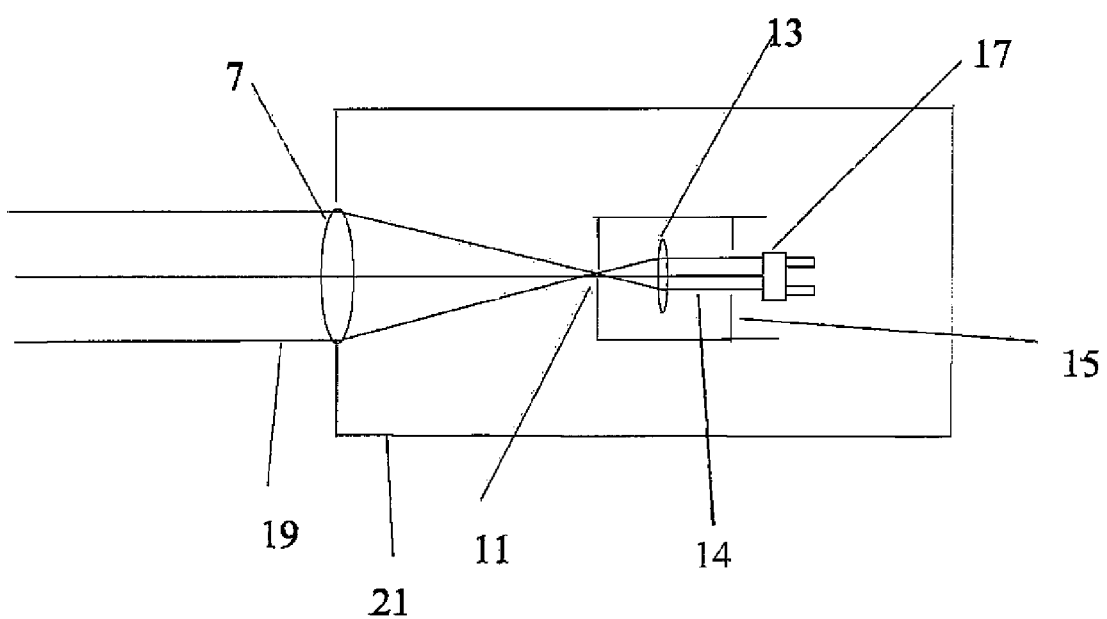
FIG. 1 shows an exemplary embodiment of an apparatus for the measurement of thermal radiation using regular glass optics and short-wave infrared detectors.

As used herein, the term thermal "infrared detector" means a photodetector that reacts to infrared radiation, and may include a short-wave infrared detector (SWIR).

As used herein, the term "short-wave infrared detector" or "SWIR" means an infrared detector that can detect a portion of or in the entire wavelength region from 2.0 µm to 2.5 µm.

As used herein, the term "photosensor" means any InGaAs photodiodes or any other photodiodes or semiconductors, which are sensitive to infrared radiation in the 900 nm to 2500 nm range. As used herein, the term photodetector may also be interpreted to include (PV) MCT photodiodes, or any photodiodes which perform or can be fabricated to perform the same or similar function as InGaAs photodiodes.

As used herein, the term "infrared source" means a detectable source of infrared radiation from which background radiation noise is filtered.

As used herein, "regular glass" or "conventional glass optics" refers to conventional glass that is normally transparent to visible light and is normally used for optical devices, which work in the visible part of the electromagnetic spectrum.

BACKGROUND

Infrared radiation consists of electromagnetic waves in the wavelength region from 0.75 µm to 1000 µm: lying between visible light and microwave light. An infrared detector is a photodetector that reacts to infrared radiation.

Measurements of thermal radiation from ambient-temperature and higher-temperature objects are utilized in a variety of settings, including but not limited to surveillance, non-destructive testing and defense applications.

In the prior art, these measurements have been obtained using cryogenically-cooled quantum detector materials such as InSb or HgCdTe and/or thermal detectors such as thermopiles, pyroelectrics, or bolometers. Although the quantum detectors have sufficient sensitivities to be able to measure thermal radiation with low noise-equivalent temperature difference (hereinafter "NETD"), the need for cryogens or cryo-coolers and the accompanying vacuum jacket for low-noise operations limit the settings in which a quantum detector can be used.

Additionally, the thermal cycling and eventual ice build-up inside the cryostat leads to poor long-term stability and responsivity. Routine maintenance of the system is cumbersome. Instruments utilizing traditional thermal detectors also suffer from low signal-to-noise ratios resulting from the low-power responsivities of the thermal detectors, which lead to high NETD.

Additionally, accuracy of traditional thermal detectors has been limited by drift of the measured signal when there are changes in the surrounding ambient temperatures. For collection optics, these traditional detectors also require the use of either reflective mirrors or refractive lenses which transmit in the mid-infrared and long-infrared wavelengths, such as those constructed using Si, Ge or ZnSe.

In the past, the use of the SWIR wavelength region for thermal imaging has been limited due to the poor signal-to-noise performances of the traditional thermal detectors. The most commonly utilized thermal detector in the SWIR wavelength region is the photoconductive PbS which requires operation with dry ice at 193 K for optimum operation. However, photoconductive PbS was found to be limited by its high noise-equivalent power, poor long-term stability of response, and possible signal nonlinearity. Other SWIR detectors, such as photoconductive HgCdTe (MCT), PbSe and InAs detectors have also been used, but with limited success.

It is desirable to have a highly responsive apparatus and process for measuring thermal radiation from ambient temperature objects in a variety of settings, without the need for cryogens or cryo-coolers and the accompanying vacuum jacket for low-noise operations, which limits the utility of such devices and methods; the present invention does not require cryogens or cryo-coolers with accompanying vacuum jackets.

It is further desirable to have a device and process that utilizes conventional glass optics. Using conventional glass optics will result in better imaging performance at lower cost and permit the detection of both SWIR and visible light through shared conventional glass optics; the present invention can use conventional glass optics.

SUMMARY OF THE INVENTION

The invention disclosed herein is an apparatus and process to measure thermal radiation from ambient-temperature objects using short-wave infrared detectors and regular-glass optics. The infrared detectors may operate in the wavelength region from 2.0 μm to 2.5 μm in an atmospheric window between absorption bands.

DETAILED DESCRIPTION OF INVENTION

FIG. 1 illustrates an exemplary embodiment of an apparatus for the measurement of thermal radiation using regular glass optics and short-wave infrared detectors. In the embodiment shown, an infrared beam 19 is directed through objective lens 7 mounted in case 21. This causes a convergence of infrared beam 19 through field stop 11 and then through collimating lens 13.

Collimating lens 13 which collimates the infrared beam to create a collimated infrared beam 14 that passes through Lyot stop 15. In the embodiment shown, Lyot stop 15 reduces the amount of flare caused by diffraction of other stops and baffles in optical systems and collimated infrared beam 14 directed to photosensor 17.

In the embodiment shown, collimated infrared beam 14 is absorbed by photosensor 17. The absorption of collimated infrared beam by photosensor 17 produces a measurable current corresponding to the intensity of the collimated infrared beam.

Figure 2:
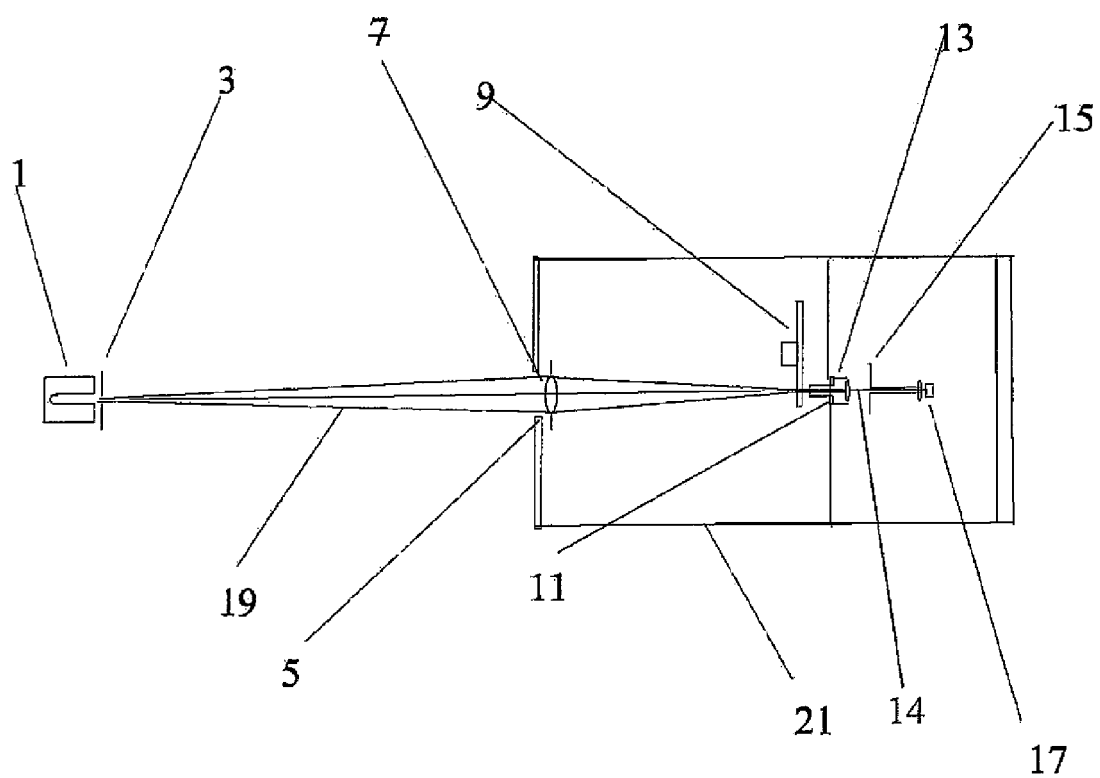
FIG. 2 shows an exemplary embodiment of an apparatus for the measurement of thermal radiation utilizing a conventional optical lens and a chopper.

FIG. 2 illustrates a further exemplary embodiment of the invention utilizing blackbody 1. In the embodiment shown, blackbody 1 creates an infrared beam 19, which passes through aperture 3, then through objective baffle 5, then through objective lens 7 mounted in case 21, which causes a convergence of infrared beam 19 through chopper 9, then through field stop 11 and then through collimating lens 13.

Collimating lens 13 collimates the infrared beam to create collimated infrared beam 14, which passes through Lyot stop 15. Collimated infrared beam 14 is directed to photosensor 17. When collimated infrared beam 14 is absorbed by photosensor 17, photosensor 17 produces a measurable current corresponding to the intensity of the collimated infrared beam.

Figure 4:
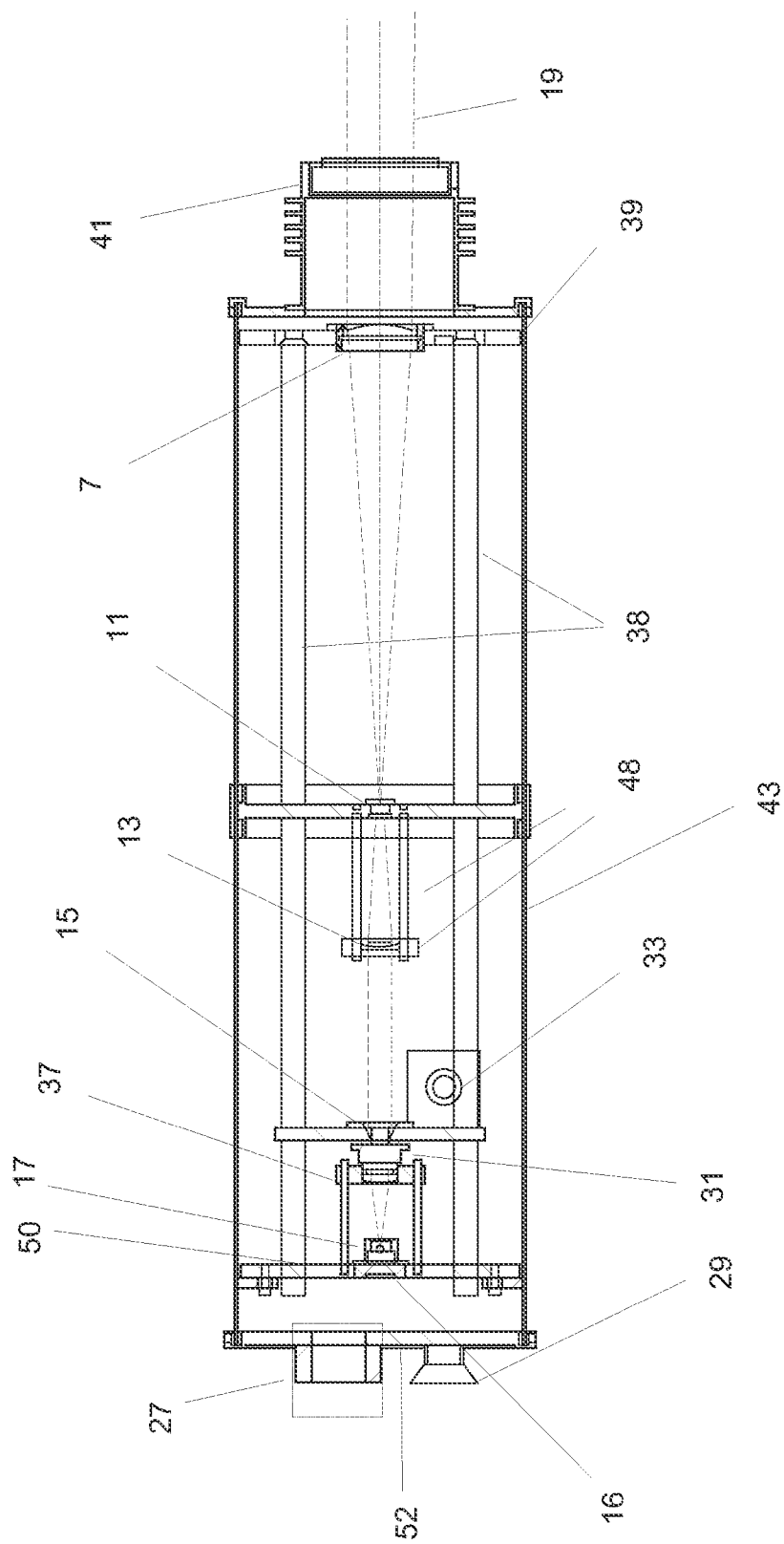
FIG. 4 shows an exemplary embodiment of an apparatus for the measurement of thermal radiation using regular glass optics and short-wave infrared detectors which are in a cylindrical form.

Both chopper 9 in FIG. 2 and shutter 41 in FIG. 4 can be equipped with reflecting surface(s) to produce a self-staring effect for the cold and constant (controlled) temperature detector in the source blocking position(s).

The chopping frequency is tuned to be selectively sensitive, within a narrow spectral band, close to the elbow of the 1/f noise spectrum of amplifier 27. Chopper 9 can be placed close to photosensor 17, close to blackbody 1, or anywhere along the optical pathway. Chopper 9 can be wheel mounted on a motor or a tuning fork.

The configuration of FIG. 2 can be used to calibrate the Apparatus so that it will have the characteristics of an infrared collimator with a 50 mm diameter entrance pupil, and the noise-equivalent irradiances (hereinafter "NEI") of <5 fW/mm$^2$. This is comparable to the irradiance sensivitiy of Si photodiode irradiance meters in the visible range and it is more than two orders of magnitude lower than liquid-Nitrogen cooled optimized-background-rejection InSb irradiance detectors.

Figure 3:
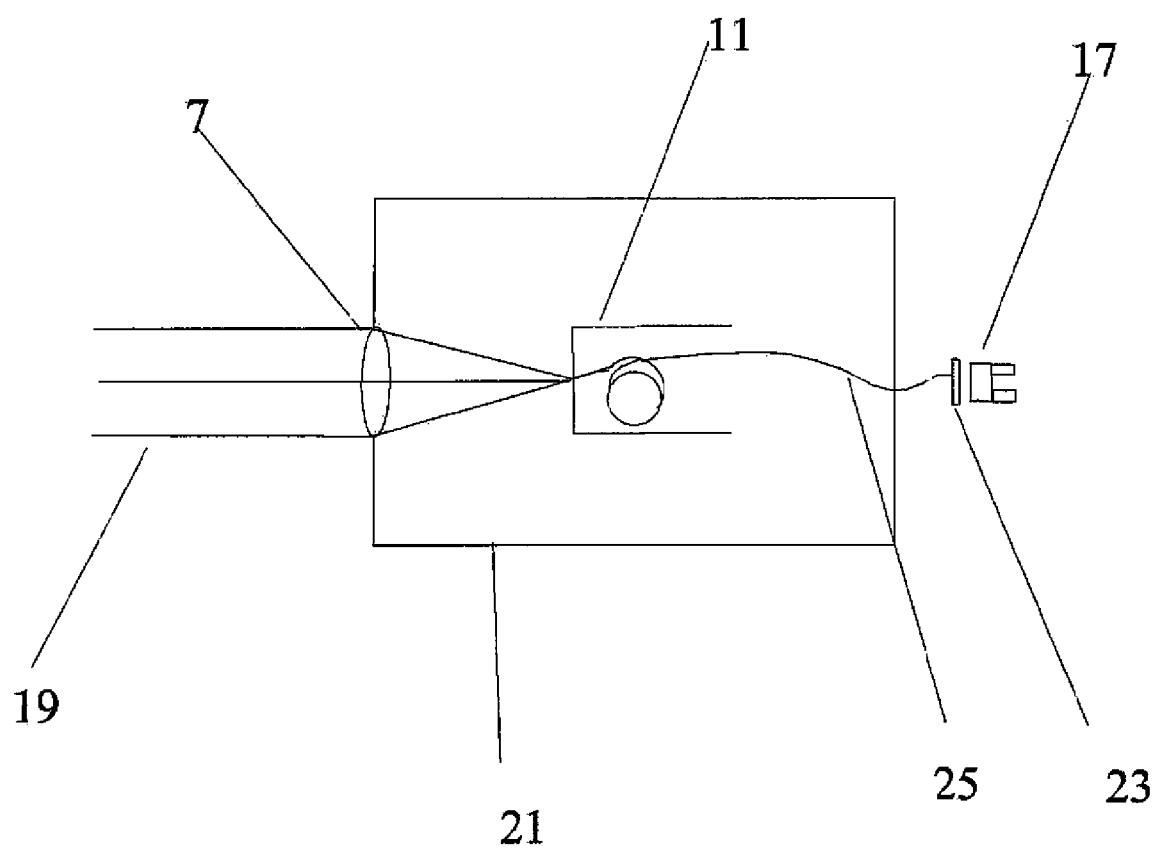
FIG. 3 shows an exemplary embodiment of the invention utilizing a conventional optical lens, a photodiode, and fiber optics.

FIG. 3 illustrates an embodiment of the invention which utilizes an infrared beam 19 directed through objective lens 7 mounted in case 21 which causes convergence of said infrared beam 19 through field stop 11 and then through fiber optic pathway 25, to cut-on filter 23 (which blocks wavelengths less than 2.0 μm), then to photosensor 17, which when collimated infrared beam 14 (not shown) is absorbed by photosensor 17.

The absorption of infrared beam 19 by photosensor 17 produces a measurable current or voltage corresponding to the intensity of the collimated infrared beam. Transmission through fiber optic pathway 25 will be sufficient if special infrared transmitting fibers are used (loss of 0.1 dB/m) and the length of fiber optic pathway 25 does not exceed 2 meters. In this case the placement of the detector can be optimized within the system.

FIG. 4 illustrates a temperature stabilized embodiment of the invention having an infrared beam 19 directed through shutter 41, then directed through an objective lens 7 mounted on lens support 39 that is attached to the interior of tube 43 (the shutter 41 can be equipped with reflecting surface(s) to produce a self-staring effect for the cold and constant (controlled) temperature detector in the source blocking position(s)). Objective lens 7 causes a convergence of infrared beam 19 through field stop 11 and then through collimating lens 13. Collimating lens 13 then collimates the infrared beam to create collimated infrared beam 14 that passes through Lyot stop 15.

Lyot stop 15 includes mounted detector lens 37. Collimated infrared beam 14, after it passes through detector lens 37 is directed to photodiode 17, which is mounted on a photodiode mount 50, with a thermo-electric cooler 16. When collimated infrared beam 14 is absorbed by photodiode 17 it produces a measurable current or voltage corresponding to the intensity of the collimated infrared beam. The current or voltage from photodiode 17 is amplified using amplifier 27. The amplified output is sent through a splitter located in a splitter housing 33 and finally through an eyepiece 29.

Also located in the splitter housing 33 of FIG. 4 is a laser diode. This laser diode is used to determine the optical axis and to aim the apparatus, which operates in the infrared and thus cannot be seen. The visible laser is introduced into the optical axis of the eyepiece 29 and then is incident on the field stop before being imaged by the objective lens. The laser's beam travels in the reverse direction as the incident beam so that the laser's beam can be seen coming out from the apparatus. Field stop 11 is seen as a dark spot in the middle of the laser beam and is imaged onto the target. This allows the operator to determine where the target area is without looking into the eyepiece 29. Sometimes the target is very uniform and fills the field of view so that the operator cannot tell where the apparatus is looking (somewhat like taking a picture of a large, uniform white wall with your camera, it is difficult to tell where you are looking).

Eyepiece 29 and amplifier 27 are mounted on eyepiece mount 52 at the end of tube 43. Temperature stabilization can be achieved by mounting the optics on rod supports 38 (graphite-epoxy rods with minimal coefficients of expansion).

Figure 5:
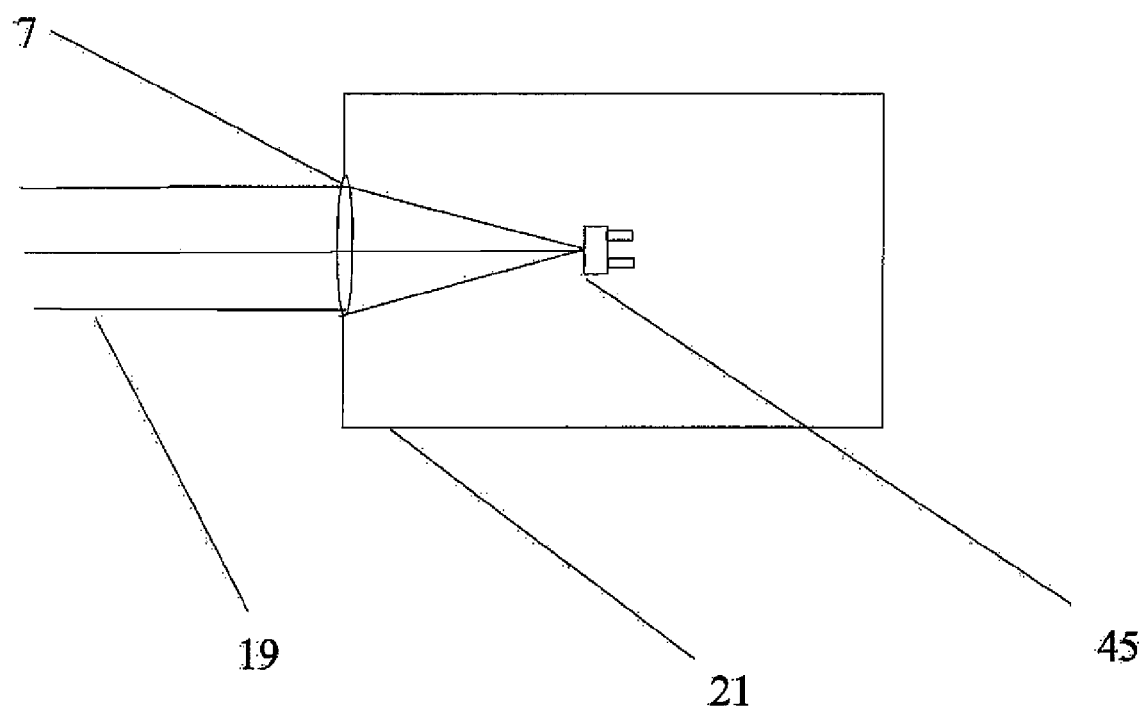
FIG. 5 shows an exemplary embodiment of the invention containing a FPA array as opposed to individual photodiodes.

FIG. 5 illustrates an exemplary embodiment in which infrared beam 19 is directed through objective lens 7 mounted in case 21 directed to back-thinned focal plane array 45, rather than photosensor 17.

In the exemplary embodiments described herein, thermoelectric ("TE") cooling components are mounted on or integrated into the base of photosensor 17. These thermoelectric cooling components are chosen for their high shunt resistance and in combination with a field-of-view limiter, the background signal can be reduced so that the detectivity, D*, of $4 \times 10^{13}$ cm Hz$^{1/2}$/W is near the background-limited performance at 295 K (in addition, the use of the regular glass optics to collect the thermal radiation results in diffraction-limited imaging, which further enhances the performance of the apparatus).

Various embodiments of the apparatus disclosed herein can measure a blackbody from 20° C. to 50° C., with a noise-equivalent temperature difference (hereinafter "NETD") of <3 mK at 50. The operation at shorter wavelengths than traditional thermal imagers also leads to lower sensitivity to the emissivity of the object in determining the temperature of the object. In the embodiments shown, the InGaAs are photodiodes which are normally sensitive to infrared radiation in the 900 nm to 1700 nm range were used. By modifying the fabrication process, InGaAs can be made to be sensitive to infrared radiation from 900 nm to 2500 nm, with the long-wavelength bandgap occurring at around 2500 nm.

The extension of responsivity to longer wavelengths results in the ex-InGaAs diodes having lower shunt resistances than the regular InGaAs photodiodes. For example, the shunt resistances of the ex-InGaAs diodes can be increased by cooling the diode with 1-stage to 4-stage thermoelectric (TE) coolers. Similarly, photovoltaic (PV) MCT photodiodes can also be used. The MCT photodiodes can be fabricated for sensitivity from 2.0 µm to 2.5 µm with long-wavelength cut-offs near 2.5 µm, distinct from the usual 10 µm to 12 µm operation of these devices. The shunt resistances of the SWIR MCT detectors can also be increased by TE cooling, and such detectors can be substituted for ex-InGaAs.

The embodiments illustrated in this document utilize TE cooled, extended InGaAs and could use short-wave, PV MCT diodes for the measurement of thermal radiation from ambient-temperature objects. The present apparatus utilizes a short wave infrared detector, which operates in a clear, atmospheric window between 2.0 µm and 2.5 µm. In this wavelength region, in contrast to other infrared bands, off-the-shelf, glass optics can be utilized for the collection of the emitted radiation. Thus, embodiments of the present invention can achieve significantly better irradiance and radiance sensitivity than detectors utilizing cryogenically-cooled InSb. Given the wavelengths, which are detected by this Apparatus, it can detect an infrared source through the glass in buildings, automobiles and other equipment.

Other embodiments of the invention may incorporate thermal imagers with low NETD to perform thermal imaging for human detection through automotive glass and building windows. Firefighters and emergency personnel could determine the presence of human beings without having to break the window and risk acceleration of smoldering fires. Although the radiation cut-on at 2.0 µm can be accomplished with a filter, the cut-off at around 2.5 can be accomplished, it is better to optimize sensitivity in the SWIR spectrum by adjusting the photosensor material during the fabrication process to avoid large background currents. These detectors can be used in a spectral wavelength region where the atmosphere has a clear window from 2.0 µm to 2.5 µm, leading to the use of refractive-glass optics without central obscurations. Furthermore, equivalent or better infrared detection capability than the traditionally used detectors can be achieved in a compact, low-maintenance design with the capabilities of heat-seeking of far-distant objects or measuring human body temperatures.

Although the description above contains many specifics, these should not be construed as limiting the scope of the embodiments but as merely providing illustrations of some of the presently preferred embodiments.

For example:

Given that conventional optics can be used in this invention, any optical configuration can be used to direct infrared light to the infrared photosensor 17. This would include, but is not limited to, lenses, mirrors, fiber optics and MIPS based optical devices. Since conventional optics are used, it is possible for both visible and infrared radiation to be detected using the same device.

Also, as one can see from the examples given, there are many potential combinations of stops, choppers, active filters, passive filters, baffles, limiters and housings that could be used to reduce or eliminate electromagnetic background noise: The goal in this instance is to find the optimal balance between background discrimination and sensitivity.

Also, although the infrared photo detectors described in various embodiments of this application are made of InGaAs (sensitive between 900 nm and 2500 nm) and HgCdTe (sensitive between 2.0 µm and 2.5 µm) given the term of an issued patent, new infrared photosensor designs and formulations with sensitivities between 2.0 µm and 2.5 µm may be available during the term of the issued patent.

Also, the output of the photosensor can be processed to measure irradiance, radiance, radiant power, the presence or absence of SWIR radiation (binary output), the output of the photosensor(s) can be used to create images or identify specific SWIR electromagnetic signatures of objects.

Finally, as is described in this application, the infrared photosensors can be cooled using thermo-electric coolers, cryogenics cooling or any other means for sufficiently reducing the temperature of the infrared photosensors. Moreover, a semiconductor material may be available in the future that will not require cooling.

Thus the scope of the embodiment should be determined by the appended claims and their legal equivalents, rather than by the examples given.

What is claimed is:

1. A infrared detection apparatus, consisting of
   a passive infrared detection apparatus assembly comprised of
   a beam having a first shape;
   at least one photosensor with a spectral filter to detect electromagnetic radiation only of critical wavelengths limited to the range of 2.0 µm to 2.5 µm;
   at least one optical lens for conveying said electromagnetic radiation from an infrared-emitting source to said photosensor, wherein said optical lens is constructed from regular glass; and
   a physical component for limiting background electromagnetic noise positioned between said infrared-emitting source and said photosensor through which said beam passes causing said beam to have a second shape,
   wherein said detection apparatus emits no wavelengths.

2. The infrared detection apparatus of claim 1, wherein said means for limiting background electromagnetic noise located between said infrared source and said photosensor is selected from a group consisting of a field stop, cut-on filter, shutter, a Lyot stop, a chopper and an active filter.

3. The infrared detection apparatus of claim 1, wherein means for limiting background electromagnetic noise is a chopper.

4. The infrared detection apparatus of claim 3 wherein said chopper includes a reflective surface.

5. The infrared detection apparatus of claim 3, which further includes an amplifier, and wherein said chopper frequency is close to the elbow of the 1/f noise spectrum of said amplifier.

6. The infrared detection apparatus of claim 3, which further includes a field stop, wherein said chopper is close to said photosensor (in front of said field stop).

7. The infrared detection apparatus of claim 1, wherein both visible light and infrared radiation are detected in the same said apparatus.

8. The infrared detection apparatus described in claim 1, wherein said photosensor is capable of being cooled using thermoelectric coolers.

9. The infrared detection apparatus of claim 1, wherein said photosensor is selected from a group of photosensors consisting of InGaAs and comprised of HgCdTe.

10. The infrared detection apparatus of claim 1, which further includes an amplifier to amplify said photosensor's output.

11. The infrared detection apparatus of claim 10, wherein said amplifier further includes adjustable (switchable) gains to maximize responsivity.

12. The infrared detection apparatus of claim 1, which further includes an eyepiece through which said photosensor's output is directed through said eyepiece.

13. The infrared detection apparatus of claim 1, wherein said at least one photosensor is arranged in a focal plane array.

14. The infrared detection apparatus of claim 1, wherein said photosensor is selected for high shunt resistance.

15. The apparatus of claim 1 which further includes an infrared emitting source.

16. A process of detecting an infrared source, comprising:
   directing SWIR towards at least one photosensor with sufficient senstivity to detect the incident SWIR at critical wavelengths limited to between 2.0 µm and 2.5 µm;
   cooling said at least one photosensor using thermoelectric coolers;
   amplifying said photosensor's output using an amplifier;
   directing said photosensor's output through an eyepiece; and
   measuring radiant power using said photosensor.

17. An infrared detection apparatus, wherein both visible and infrared radiation are detected in the same apparatus comprising:
   a passive infrared detection apparatus assembly comprised of
      at least one photosensor with a spectral filter to detect electromagnetic radiation of critical wavelengths limited to the range of 2.0 µm to 2.5 µm;
      at least one optical lens for conveying radiation wherein said at least one optical lens is constructed of regular glass;
      at least one amplifier; and
      at least one physical component for limiting background electromagnetic noise located between said infrared-emitting source and said photosensor,
   wherein said detection apparatus emits no wavelengths.

* * * * *